United States Patent
Caldichoury et al.

(10) Patent No.: US 7,973,650 B2
(45) Date of Patent: Jul. 5, 2011

(54) MOTOR VEHICLE TIRE PRESSURE MONITORING SYSTEM AND DIAGNOSIS METHOD USING THIS SYSTEM

(75) Inventors: Anne Caldichoury, Saint-Cloud (FR); Olivier Costes, Cugnaux (FR)

(73) Assignees: Renault SAS, Boulogne-Billancourt (FR); Continental Automotive France, Toulouse (FR)

( * ) Notice: Subject to any disclaimer, the term of this patent is extended or adjusted under 35 U.S.C. 154(b) by 269 days.

(21) Appl. No.: 12/096,460

(22) PCT Filed: Dec. 6, 2006

(86) PCT No.: PCT/FR2006/051292
§ 371 (c)(1),
(2), (4) Date: Jun. 6, 2008

(87) PCT Pub. No.: WO2007/066043
PCT Pub. Date: Jun. 14, 2007

(65) Prior Publication Data
US 2008/0303651 A1   Dec. 11, 2008

(30) Foreign Application Priority Data
Dec. 9, 2005  (FR) .................................... 05 12519

(51) Int. Cl.
*B60R 25/10* (2006.01)

(52) U.S. Cl. ................ 340/426.33; 73/146.2; 116/34 R; 340/442; 340/445; 340/447

(58) Field of Classification Search ............. 340/426.33, 340/442–449; 73/146.2–146.5; 116/34 R; 701/29–35
See application file for complete search history.

(56) References Cited

U.S. PATENT DOCUMENTS

| | | | |
|---|---|---|---|
| 5,559,484 A | 9/1996 | Nowicki et al. | 340/447 |
| 6,505,507 B1 * | 1/2003 | Imao et al. | 73/146.5 |
| 2004/0017291 A1 * | 1/2004 | Hardman et al. | 340/505 |
| 2004/0049329 A1 * | 3/2004 | Yamamoto et al. | 701/29 |
| 2004/0103967 A1 * | 6/2004 | Majumdar et al. | 152/450 |
| 2005/0150283 A1 * | 7/2005 | Shick et al. | 73/146 |

FOREIGN PATENT DOCUMENTS

| | | |
|---|---|---|
| DE | 10058099 | 5/2002 |
| FR | 2746350 | 9/1997 |
| FR | 2819613 | 7/2002 |

* cited by examiner

*Primary Examiner* — Brent Swarthout
(74) *Attorney, Agent, or Firm* — Allen, Dyer, Doppelt, Milbrath & Gilchrist, P.A.

(57) ABSTRACT

The motor vehicle tire pressure monitoring system includes a computer to receive input data including at least one tire pressure and transmit a warning to a driver of the vehicle in the event of an abnormal pressure in the tire. The system also includes a recording unit designed to record the input data from the monitoring system in the event that the warning is transmitted to the driver. The data recorded in this recording unit is accessible for diagnosis.

4 Claims, 1 Drawing Sheet

MOTOR VEHICLE TIRE PRESSURE MONITORING SYSTEM AND DIAGNOSIS METHOD USING THIS SYSTEM

FIELD OF THE INVENTION

This invention relates to a motor vehicle tire pressure monitoring system.

BACKGROUND OF THE INVENTION

A motor vehicle tire pressure monitoring system is disclosed for example in published French patent application FR 2 819 613. The function of known tire pressure monitoring systems is to monitor the pressure of each wheel and warn the driver if the pressure in one of the tires is incorrect (underinflated, punctured, overinflated and so forth).

A complete system includes four wheel units which measure, and send by electromagnetic RE (radio frequency) waves, their pressure and temperature, and a computer which processes this data and warns the driver in the event of an abnormal wheel pressure. In this type of system, one of the functions required is to run a diagnosis of the system, where "diagnosis" refers to a way of analyzing system faults in an after-sales environment, that is at a garage or at the manufacturer's research unit. At the present time the diagnosis associated with the tire pressure monitoring system remains limited to diagnosing the nature of the operating faults of the system.

SUMMARY OF THE INVENTION

An object of the present invention is to overcome the above discussed drawback. The subject of the invention is therefore a motor vehicle tire pressure monitoring system comprising a computer designed to receive input data including at least one tire pressure and to transmit a warning to a driver of the vehicle in the event of an abnormal pressure in the tire. The system also includes a recording unit designed to record the input data from the monitoring system in the event that the warning is transmitted to the driver, the data recorded in this recording unit being accessible for diagnosis.

A monitoring system according to the invention is thus able to record a number of specific useful data, as soon as a pressure warning occurs. The system thus proposed also makes possible an in-depth analysis after the event of faults relating to false alerts (false puncture alert, false underinflation alert, etc.). Moreover, the proposed system also makes it possible to analyze the context of a pressure warning to allow the most appropriate after-sales action to be taken.

The embodiment presented is not restrictive and can be extended to any type of pressure warning (underinflation, punctures, overinflation, leaks, unbalanced pressures, pressure not suitable for the speed, etc.). The recording unit of the system is preferably also designed to record the input data, before and after the transmission of the warning to the driver. The diagnosis can therefore be carried out in light of all the data recorded before and after a warning was triggered, thus enabling a complete after-the-event picture of the situation that led up to a warning to be obtained.

The input data received by the monitoring system preferably includes the tire pressures and distance (e.g. the number of kilometers) traveled. In addition, the data may also optionally include a reading of the tire temperatures and a reading of the speed of the motor vehicle. However, other data may also be recorded, such as the mode of operation of each wheel and the acceleration or deceleration of each wheel to enable the cause or defect that led up to the triggering of a warning to be diagnosed accurately.

The invention also relates to a diagnosis method using a monitoring system as described above, wherein it involves reading the input data recorded in the recording unit, identifying the datum or data responsible for triggering the warning, and examining a chart of the data against time before and/or after the triggering of the warning. For this purpose the data responsible for triggering the warning can be compared with reference data. A chart or graph of the data before and after the warning was triggered can also be tracked to see if the warning was justified or not justified.

BRIEF DESCRIPTION OF THE DRAWINGS

A clearer understanding of the invention will be gained from the following description, which is given purely by way of example and refers to the accompanying drawings, in which.

DETAILED DESCRIPTION OF THE PREFERRED EMBODIMENTS

Figure 1:
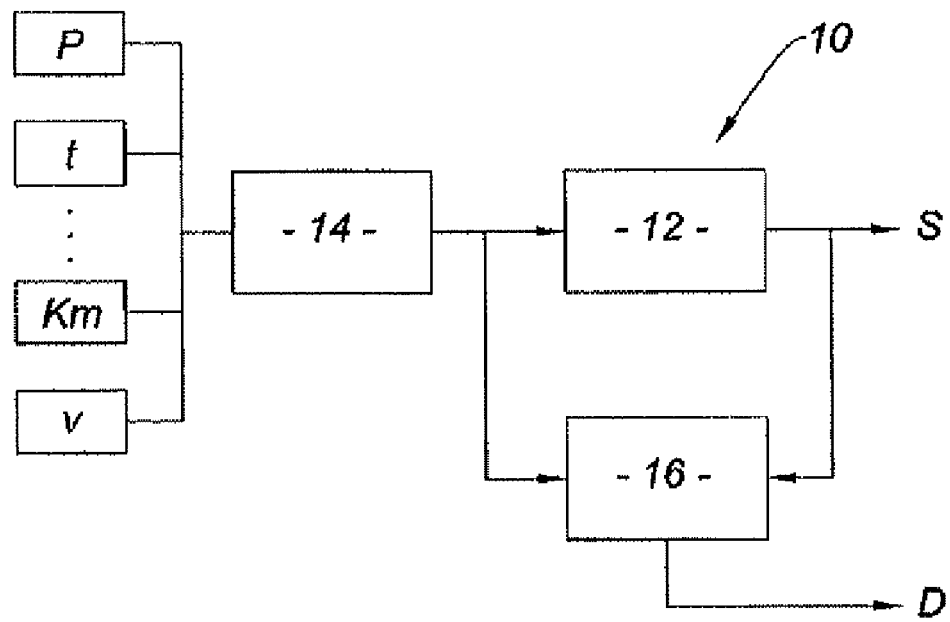
FIG. 1 is a schematic block diagram illustrating the structure of a motor vehicle tire pressure monitoring system according to the invention.

In FIG. 1, the reference 10 is a general designation for a motor vehicle tire pressure monitoring system. The system 10 comprises a computer 12 receiving input data P, t, km, V via a data transmission module 14 designed to transmit a warning S to a driver of the motor vehicle in the event of an abnormal pressure in at least one tire. The computer 12 may be of the same type as that disclosed in FR 2 819 613.

The warning may be displayed on the dashboard or be transmitted to the driver in the form of an audible signal. The display may for example indicate the value of the abnormal pressure accompanied by a number or letter denoting in which tire the pressure is abnormal. The input data of the system may include, besides the pressure P, the distance km (number of kilometers) traveled by the tire or tires, and optionally a reading t of the temperature of the tires and the speed V of the vehicle.

In accordance with the invention, the monitoring system 10 also includes a unit 16 designed to record the input data P, t, km, V of the system if a warning is transmitted, specifically the pressure P, the distance km and optionally the temperature t and speed V. Once recorded, the data can be accessed to make a diagnosis D and identify the data which gave rise to a warning. This diagnosis D is carried out at a garage or at a research unit by connecting an apparatus such as a computer to the output of the recording unit 16. This apparatus can be used to read the data, namely the pressure of a tire, the temperature, the speed of the vehicle which gave rise to the warning, and the distance traveled by the tire.

The operator can thus determine whether or not these values are abnormal values, in other words sufficiently different from reference values. The operator can thus determine whether or not the triggering of the warning was justified. To give a complete after-the-event picture of the situation which led up to a warning, the input data are recorded permanently, that is to say before and after the triggering of the warning.

Figure 2:
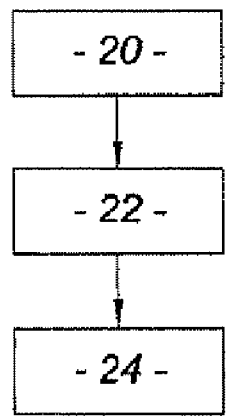
FIG. 2 is a flow chart showing the preferred steps in a diagnosis method according to the invention.

During diagnosis, the data can be observed as it changes over time. It will thus be possible to see whether or not the datum or data responsible for the warning were changing slowly or suddenly over time, whether they degraded after the warning, or whether instead they reverted to normal after the warning was triggered. The method employed to produce this diagnosis D is illustrated in FIG. 2.

In a first step 20 the input data recorded in the recording unit 16 are read. Next, in a step 22, the datum or data responsible for triggering the warning S are identified. Then, in a final step 24, the graph or chart of the data over time before and/or after the triggering of the warning is examined.

To take an example, the following table shows a record of the pressures of a tire measured before and after a warning was triggered at an instant a.

| Time | Pressure |
|------|----------|
| a − 2 | 2 bar |
| a − 1 | 2 bar |
| a | 1.5 bar → warning S |
| a + 1 | 2 bar |
| a + 2 | 2 bar |

In this example, the warning S was triggered at time a because of a pressure of 1.5 bar which has suddenly dropped below the normal value of 2 bar sensed at times a−2 and a−1. The example given above also shows that the pressures recorded after the warning reverted to normal. The diagnosis can therefore conclude in this example that an erroneous pressure was recorded at the instant a due to a particular event such as an impact to the tire. The conclusion can be drawn in this case that the warning was a false alert.

By reading the recorded data it is thus possible to diagnose the cause which triggered the warning, such as an underinflation of a tire, a puncture, a leak, an unbalanced pressure, a pressure not suitable for the speed, etc. The data can be recorded in a volatile or nonvolatile memory with a backup of the data even in the event of disconnection of all the electrical power supplies of the vehicle. Furthermore, several sets of data associated with different warnings can be stacked. In other words, several warnings with their context of respective data can be recorded in memory to refine the diagnosis. Other data than those mentioned above can of course be recorded, such as the mode of operation of each wheel, the acceleration or deceleration of each wheel, etc.

In summary, the main advantages of the system described above are as follows: it makes it possible to analyze malfunctions, and in particular to identify false alerts, it makes it possible to dissociate the origins from the warnings, it makes it possible to perform a fine analysis so that after-sales service need only change the part pinpointed by the diagnosis.

That which is claimed is:

1. A vehicle tire monitoring system to be mounted on a vehicle for monitoring a parameter of at least one tire on the vehicle, the monitoring system comprising:
   a plurality of wheel units each respectively associated with a tire of the vehicle to measure a tire parameters thereof including tire pressure, distance traveled and speed of the vehicle;
   a transmission module coupled to the wheel units to transmit the tire parameters;
   a processor to receive the tire parameters as tire input data from the plurality of wheel units via the transmission module and to transmit a warning to a driver of the vehicle based upon the measured tire pressure, distance traveled and speed of the vehicle; and
   a recording unit to record the tire input data from the processor before, during and after the warning is transmitted to the driver, and including a memory configured to store the tire input data even during loss of electrical power to the system, the recorded input data being accessible for diagnosis by an external apparatus used to access the tire pressure, distance traveled and the speed of the vehicle recorded before, during and after the warning was transmitted to the driver.

2. The monitoring system as claimed in claim 1, wherein the tire parameters also include tire temperatures.

3. A diagnosis method for monitoring a parameter of a vehicle tire, the method comprising:
   measuring tire parameters for the tire including tire pressure, distance traveled and speed of the vehicle;
   transmitting the tire parameters;
   using a vehicle tire monitoring system including a processor to receive the transmitted tire parameters as input data and to transmit a warning to a driver of the vehicle based upon measured tire pressure, distance traveled and speed of the vehicle, and a recording unit to record the input data from the processor before, during and after the warning is transmitted to the driver including use of a memory configured to store the tire input data even during loss of electrical power to the system;
   reading the input data recorded in the recording unit via an external apparatus to access the tire pressure, distance traveled and the speed of the vehicle recorded before, during and after the warning was transmitted to the driver;
   identifying the input data associated with the warning; and
   examining the identified input data over a time range including the warning.

4. The method as claimed in claim 3, wherein the tire parameters also include tire temperatures.

* * * * *